United States Patent [19]
Burenga

[11] 3,717,045
[45] Feb. 20, 1973

[54] TRACTOR POWER TAKE-OFF DRIVE FOR CENTRIFUGAL PUMP

[75] Inventor: Thomas I. Burenga, Evanston, Ill.

[73] Assignee: TSC Industries Inc., Chicago, Ill.

[22] Filed: Oct. 12, 1971

[21] Appl. No.: 188,100

[52] U.S. Cl. .................. 74/15.6, 74/13, 74/206, 415/122
[51] Int. Cl. .................. F16h 37/00, F16h 13/02
[58] Field of Search ............ 74/13, 15.6, 206, 216; 415/122; 180/33 WA, 33 D

[56] References Cited

UNITED STATES PATENTS

| 2,111,422 | 3/1938 | Fawick | 74/206 X |
| 3,516,576 | 6/1970 | Elliot | 74/13 X |

FOREIGN PATENTS OR APPLICATIONS

| 1,170,233 | 11/1969 | Great Britain | 415/122 |

Primary Examiner—Leonard H. Gerin
Attorney—James B. Kinzer et al.

[57] ABSTRACT

A centrifugal pump assembly driven from the power take-off shaft of a farm tractor, comprising a drive roller affixed to the pump shaft externally of the pump housing, a power take-off coupling connected to the tractor PTO shaft and having a drive shaft projecting outwardly of the coupling with the end of the drive shaft mounted in a drive shaft support. The drive shaft support is affixed to the pump housing, so that the drive shaft is maintained in parallel spaced relation to the pump shaft. A small rubber tire, supported by the drive shaft and driven from the PTO coupling, engages the drive roller to drive the centrifugal pump; the tire diameter is at least three times the diameter of the drive roller to afford a high speed pump drive.

4 Claims, 2 Drawing Figures

PATENTED FEB 20 1973

INVENTOR
THOMAS I. BURENGA

BY
Kinzer, Dorn and Zickert
ATTORNEYS

3,717,045

TRACTOR POWER TAKE-OFF DRIVE FOR CENTRIFUGAL PUMP

BACKGROUND OF THE INVENTION

It is often desirable or even essential to operate a fluid pump from the power take-off shaft of an agricultural tractor or similar working vehicle. Pumping with a tractor functioning as the prime power source may be utilized for irrigation, for the distribution of liquid fertilizers, and for many other purposes.

Pumps of two substantially different types of rotary pump that are in widespread use for agricultural operations, based upon a tractor PTO drive, are rotary roller pumps and centrifugal pumps. The rotary roller pump is usually operated at a rotational speed corresponding to that of the tractor PTO shaft and hence is directly coupled to that shaft. The centrifugal pump, however, requires an operating speed substantially in excess of the usual tractor PTO shaft speed and thus must include a step-up drive. The present invention is concerned with a centrifugal pump assembly driven from the power take-off shaft of a farm tractor.

Efficient centrifugal pumps, of the kind best suited for farming and similar applications, usually require rotor speeds of about 3000 to 3600 rpm. Farm tractor PTO shaft speeds, on the other hand, are generally standardized at 540 rpm, 600 rpm and 1000 rpm. In the past, a wide variety of step-up drives have been utilized for centrifugal pumps driven from tractor PTO shafts. Belt drives, chain drives, planetary gear drives and direct gear drives have all been employed. These step-up drive mechanisms have all had one common difficulty; they tend to break and fail under the shock load induced when the tractor operator snaps the clutch for the PTO shaft into engagement at a time when the pump is filled with water. The shock load produced when a solid object, such as a small rock or clod of clay, is drawn into the pump, affords the same results.

The shock load from rapid clutch engagement can be alleviated somewhat by careful work on the part of the tractor operator, in letting in the clutch, in some instances. On some tractors, however, careful clutch operation is of no assistance because the PTO shaft clutch is one that inherently engages with a snap action. Steps can also be taken to screen out solid materials, in the pump inlet, but this is difficult to accomplish, in many instances, without substantial reduction in pump efficiency.

One previously proposed PTO drive for a centrifugal pump, which recognizes the problems discussed above, is shown in Sadler U.S. Pat. No. 3,583,825, which affords a planetary gear drive connection from the tractor PTO shaft to the centrifugal pump. To alleviate the shock problem presented when the PTO shaft clutch is engaged, the Sadler construction utilizes a plurality of resilient pads in the mounting of the ring gear for the planetary drive. The same construction affords some protection against shock loading that may occur when foreign matter enters the centrifugal pump, a quite common occurrence when pumping from a pond or other unprotected water supply. Nevertheless, the patent notes that the planetary drive should be provided with sacrificial gearing to isolate the point of breakdown of the driven when excessive shock loading occurs.

SUMMARY OF THE INVENTION

It is a principal object of the present invention, therefore, to provide a new and improved centrifugal pump assembly to be driven from the power take-off shaft of a farm tractor, in which the step-up drive from the tractor PTO shaft to the centrifugal pump is inherently and effectively protected against shock loading caused either by snap engagement of the PTO shaft clutch or by entry of solid matter into the centrifugal pump.

Another object of the invention is to provide a new and improved self-protecting power take-off drive for a centrifugal pump that is simple and inexpensive in construction and that requires little or no maintenance over long periods of operation.

A particular object of the invention is to provide a new and improved shock-protected step-up drive, in a centrifugal pump assembly operated from the PTO shaft of a farm tractor, that does not require shielding against rain, dirt, or other adverse environment, yet affords reliable operation over long periods of time and under adverse environmental conditions.

Accordingly, the invention relates to a centrifugal pump assembly for operation from the power take-off shaft of a tractor. The pump assembly comprises a centrifugal pump including a pump housing, a rotary impeller mounted within the housing, and a pump shaft connected to the impeller and projecting outwardly of the pump housing. A drive roller is mounted on the pump shaft externally of the pump housing. A power take-off coupling, adapted for connection to the power take-off shaft of a tractor, is incorporated in the assembly, together with a drive shaft having one end affixed to the power take-off coupling. The outer end of the drive shaft is supported in a drive shaft support that is affixed to the pump housing and that maintains the drive shaft in predetermined parallel spaced relation to the pump shaft. A resilient tire, preferably a pneumatic rubber tire, is mounted on the medial portion of the drive shaft with the tread of the tire engaging the drive roller to drive the pump shaft at a speed substantially higher than the rotational speed of the drive shaft, the effective diameter of the tire being at least three times the diameter of the drive roller.

DESCRIPTION OF THE PREFERRED EMBODIMENT

Figure 1:
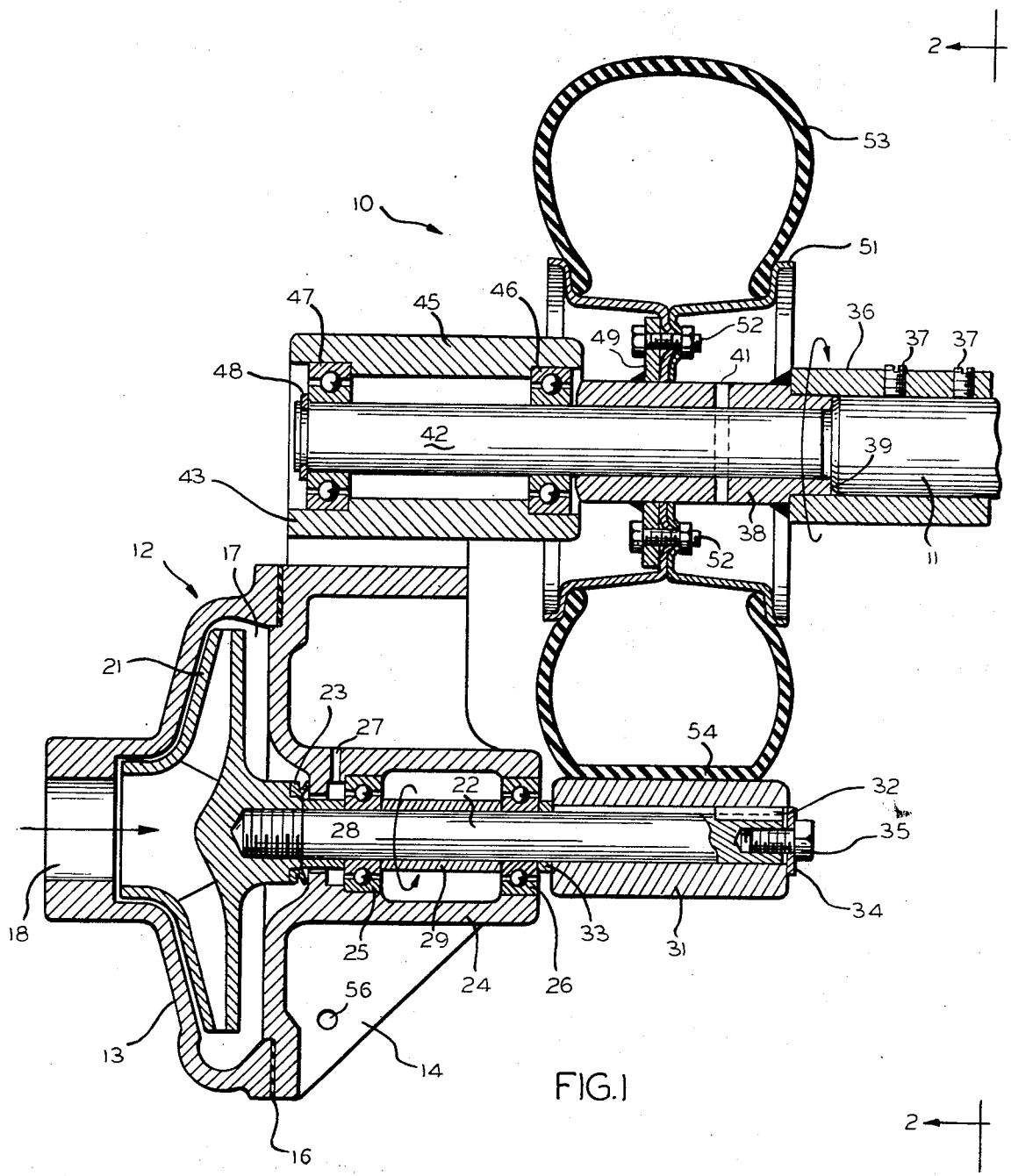
FIG. 1 is a sectional elevation view of a centrifugal pump assembly constructed in accordance with a preferred embodiment of the invention.
Figure 2:
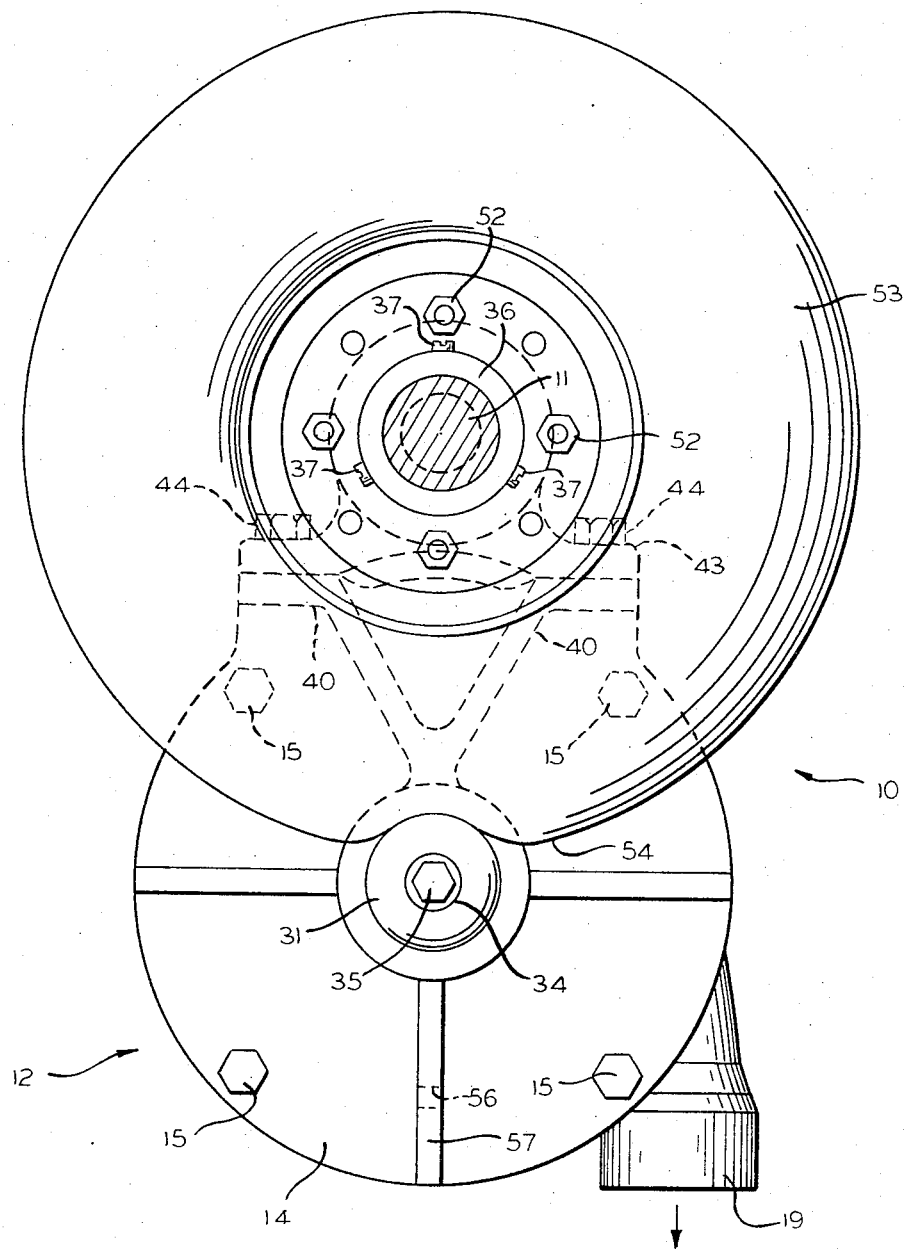
FIG. 2 is an end elevation view of the centrifugal pump assembly taken approximately along the line 2—2 in FIG. 1.

FIGS. 1 and 2 illustrate a centrifugal pump assembly 10 driven from the power take-off shaft 11 of a tractor. Only a limited portion of the tractor shaft 11 is shown in the drawings. Pump assembly 10 is constructed to be driven from a PTO shaft 11 having a rotational speed of 540 rpm or 600 rpm, both speeds being standard for tractor models from different tractor manufacturers. Pump assembly 10 can also be operated from a tractor PTO shaft rotating at 1000 rpm, another standard speed, with a minor modification as described hereinafter.

Pump assembly 10 comprises a centrifugal pump 12. The centrifugal pump 12 includes a volute housing member 13 mounted upon a housing base 14 by means of a plurality of mounting bolts 15 (FIG. 2). A gasket 16 (FIG. 1) is interposed between the housing sections 13 and 14, so that the two housing sections define a sealed pumping chamber 17. The inlet opening 18 to pump 12 is formed in housing member 13 and is coaxial with the pump housing. The pump outlet 19 is located at the outer rim of the pump housing as shown in FIG. 2. Both of the housing members 13 and 14 are preferably formed as metal castings, usually being fabricated of cast iron.

A rotary impeller 21 is mounted within the pumping chamber 17 in pump 12, as shown in FIG. 1. Impeller 21 may be of conventional construction and may be fabricated as a metal casting or may be of molded plastic construction. The particular configuration employed for the centrifugal pump impeller 21 is not critical and hence has not been shown in detail in the drawings.

Impeller 21 is mounted upon one end of a pump shaft 22. In the illustrated construction, impeller 21 is threaded upon the end of shaft 22 that projects into chamber 17. Alternatively, a key connection or other appropriate mounting means may be employed. In the illustrated pump, impeller 21 is equipped with a resilient seal ring 23 around the part of the impeller that is mounted to shaft 22. Seal ring 23 engages the inner wall of pump chamber 17 to seal off the pump chamber from the bearings for pump shaft 22.

The base housing member 14 of centrifugal pump 12 includes a pump shaft bearing hub 24 within which two ball bearings 25 and 26 are mounted. Bearings 25 and 26 support shaft 22 and maintain the shaft and the pump impeller in alignment with the pump housing, while permitting free rotational movement of both the pump shaft and the impeller. A weep hole 27 is provided to dispose of any fluid leaking past seal 23 without damage to bearing 25. The longitudinal positions of impeller 21 and bearings 25 and 26 are maintained by a spacer 28 interposed between impeller 21 and bearing 25 and by a spacer 29 between bearings 25 and 26.

Shaft 22 projects outwardly of the bearing support hub 24 of housing member 14 (FIG. 1). A small drive roller 31 is mounted upon the extension portion of the pump shaft. Roller 31 includes an internal key 32 which fits into an appropriate keyway in shaft 22 to afford a driving connection between the roller and the shaft. A spacer ring 33 may be interposed between bearing 26 and roller 31 to maintain roller 31 in fixed longitudinal position on shaft 22. Drive roller 31 is held in position on shaft 22 by appropriate means such as a washer 34 and a mounting bolt 35.

Centrifugal pump assembly 10 further comprises a power take-off coupling 36 specifically adapted for connection to the power take-off shaft 11 of a tractor. In the illustrated construction, the PTO coupler 36 is a metal sleeve that fits over the end of the tractor shaft 11 and is secured to the shaft by a plurality of set screws 37 (FIGS. 1 and 2) projecting through threaded openings in the wall of the sleeve into engagement with the shaft. Other forms of PTO coupler, providing an effective mechanical connection to shaft 11, may be utilized as desired.

An extension sleeve 38 is fitted into the end of the PTO coupler sleeve 36 and is welded to sleeve 36 to form an integral part of the PTO coupling. Sleeve 38 affords a shoulder 39 that engages the end of the shaft 11. Sleeve 38 is provided with two radial openings that receive a pin 41. Pin 41 extends radially through a drive shaft 42 that is positioned within sleeve 38 and that projects outwardly of the end of the sleeve opposite the tractor PTO shaft 11. Thus, it is seen that the drive shaft 42 is effectively affixed to the power take-off coupling sleeve 36, through pin 41 and sleeve 38.

A drive shaft support hub 43 is affixed to the top of the housing of pump 12, being mounted on the pump housing by appropriate means such as the bolts 44 secured to stiffener webs 40 that are formed integrally with housing member 14 (FIG. 2). The upper part of the drive shaft support hub 43, which is preferably formed of cast iron, comprises a cylinder 45 within which two ball bearings 46 and 47 are mounted. The inner races of bearings 46 and 47 are mounted upon shaft 42, which projects axially through cylinder 45. A clamp ring 48 completes the bearing assembly for drive shaft 42, the mounting of the drive shaft in bearings 46 and 47 serving to maintain the drive shaft in parallel spaced relation to pump shaft 22.

A mounting flange 49 is affixed to the central portion of the PTO coupler extension sleeve 38. Flange 49 may comprise a steel plate having a central opening to receive sleeve 38, and preferably is welded to the sleeve. A tire rim or wheel 51 of conventional construction is mounted upon flange 49 by means of a plurality of lug bolts 52, and a small pneumatic tire 53 is mounted upon rim 51. In a typical construction, tire 53 may have an overall diameter, when fully inflated, of about ten inches. The tread 54 of tire 53 engages drive roller 31 in firm frictional driving relationship. In the illustrated construction, the effective diameter of tire 53, at its point of engagement with drive roller 31, is approximately six times the diameter of the drive roller, affording a pump speed of about 3240 rpm for a rotational speed of PTO shaft 11 of 540 rpm. For a tractor shaft speed of 600 rpm, the same construction provides a pump shaft speed of about 3600 rpm, within the design limits for centrifugal pump 12.

When pump assembly 10 is mounted on a tractor, it is desirable to secure the pump against rotation relative to shaft 11. This is conveniently accomplished by a chain (not shown) connected to some part of the tractor frame and to the pump housing; an aperture 56 in one of the reinforcing ribs 57 of housing member 14 can be utilized for this purpose.

In operation, pumping is initiated by the tractor operator, engaging the clutch on the tractor to drive the power take-off shaft 11. The rotation of shaft 11 results in a corresponding rotation of drive shaft 42, through the positive connection afforded by the PTO coupler sleeves 36 and 38, and pin 41. Tire 53, through its mounting on the extension sleeve 38 of PTO coupler 36, is driven at the same angular speed as shaft 11, in this instance 540 to 600 rpm. The frictional engagement between tire 53 and drive roller 31 results in rotation of drive roller 31, but at a speed much higher than drive shaft 42. The step-up ratio in this machine is about 6:1. Accordingly, pump shaft 22 and impeller 21 are driven at a rotational speed of about 3240 to 3600 rpm.

The driving connection incorporated in pump assembly 10 is inherently self-protecting with respect to shock loading which may occur from snap engagement of the clutch to shaft 11 or from the entry of some solid material (e.g. gravel, small rocks, or foreign hardward) into pump 12. Shock from either source results primarily in limited slippage between the tread 54 of tire 53 and the peripheral surface of drive roller 31. The slippage can be controlled by the air pressure maintained in tire 53; preferably, the tire has an unstressed radius somewhat larger than the space between the axis of shaft 42, and the periphery of roller 31, as illustrated. With this arrangement, and particularly if tire 53 is inflated only two a relatively low pressure, there is virtually no slippage in normal operation, due to the large surface contact between tire 53 and roller 31, yet the tire can absorb a wide range of shock loads without structural damage.

The drive incorporated in pump assembly 10 does not require the utilization of sacrificial elements. It is capable of sustained operation over long periods of time despite substantial shock loads, as described above. In comparison with conventional planetary gear drives and most other drive arrangements, the drive employed in pump assembly 10 is quite inexpensive. It can be left exposed for indefinite periods of time without appreciable damage, requiring no protection against rin, dirt, or similar environmental conditions likely to be encountered quite regularly in farm use. The part of the pump assembly 10 subject to the greatest wear, tire 53, lasts for a long period of operation, and can be replaced quite inexpensively. Of course, protective dust covers can be provided for the bearings in assembly 10, if desired, or sealed bearings may be utilized. It will be recognized that shaft 42 need not rotate with PTO coupler 36; shaft 42 may be fixedly mounted on support 43, with the bearings 46 and 47 interposed between shaft 42 and the PTO coupling 36.

For a tractor having a PTO shaft speed of 1000 rpm, only a minimal modification is required for pump assembly 10. The simplest revision, to accommodate the different tractor shaft sped, incorporates a spacer between pump housing member 14 and the drive shaft support hub 43. In this same modification, a larger drive roller 31 is utilized, to again achieve a good driving connection between the roller and tire 53. With this limited change, it is a relatively simple matter to obtain a drive ratio of approximately 3:1 as required for the higher tractor shaft speed.

I claim:

1. A tractor-driven centrifugal pump assembly, for connection to the power take-off shaft of a tractor, comprising:
   a centrifugal pump including a pump housing, a rotary impeller mounted within the housing, and a pump shaft connected to the impeller and projecting outwardly of the pump housing;
   a drive roller of given diameter mounted on the pump shaft externally of the pump housing;
   a power take-off coupling adapted for connection to the power take-off shaft of a tractor;
   a drive shaft extending axially of and supporting one end of said power take-off coupling;
   a drive shaft support, affixed to said pump housing, affording a support for the drive shaft, maintaining the drive shaft and the PTO coupling in predetermined parallel spaced relation to said pump shaft;
   and a resilient tire mounted on the PTO coupling with the tread of the tire engaging said drive roller, the ratio of diameters of said tire and said drive roller being at least 3:1 for driving the pump shaft at a speed greater than the rotational speed of the PTO coupling in accordance with said ratio.

2. A tractor-driven centrifugal pump assembly, according to claim 1, in which said tire is a rubber tire having an unstressed radius somewhat larger than the spacing between the drive shaft axis and the periphery of the drive roller, to afford a substantial area of frictional engagement between the drive roller and the tire tread.

3. A tractor-driven centrifugal pump assembly, according to claim 2, in which said tire is a pneumatic rubber tire inflated to a limited pressure.

4. A tractor-driven centrifugal pump assembly, according to claim 1, in which said drive shaft support is removably mounted on said pump housing to allow a change in drive ratio by alternation of the spacing between said drive shaft and said pump shaft.

* * * * *